United States Patent [19]

Cann et al.

[11] Patent Number: 5,070,057

[45] Date of Patent: Dec. 3, 1991

[54] SIMPLIFIED POLYETHYLENE CATALYST SYSTEM

[75] Inventors: Kevin J. Cann, Rocky Hill; Frederick J. Karol, Belle Mead, both of N.J.; Arthur E. Marcinkowsky, Charleston, W. Va.

[73] Assignee: Union Carbide Chemicals and Plastics Technology Corporation, Danbury, Conn.

[21] Appl. No.: 502,678

[22] Filed: Apr. 2, 1990

[51] Int. Cl.$^5$ .............................................. C08F 4/02
[52] U.S. Cl. ................................... 502/119; 502/120; 502/123; 502/125; 502/126; 502/127
[58] Field of Search ............... 502/119, 120, 126, 125, 502/123, 127

[56] References Cited

U.S. PATENT DOCUMENTS

| | | | |
|---|---|---|---|
| 4,263,171 | 4/1981 | Shida et al. | 502/104 |
| 4,412,049 | 10/1983 | Shiga et al. | 502/126 |
| 4,508,842 | 4/1985 | Beran et al. | 502/112 |

*Primary Examiner*—Patrick P. Garvin
*Assistant Examiner*—E. D. Irzinski
*Attorney, Agent, or Firm*—John S. Piscitello

[57] ABSTRACT

An improved support vanadium catalyst, especially an improved Beran et al. catalyst system and ethylene polymerization process in which the improvement derives from fixing the promoter to a component of the catalyst composition such that it is a molecularly structural component of the catalyst and thus is not separately fed to the polymerization reaction, but instead is part of the catalyst composition fed to the reaction.

42 Claims, No Drawings

SIMPLIFIED POLYETHYLENE CATALYST SYSTEM

RELATED APPLICATIONS

This application is related to copending and commonly owned application, K. J. Cann et al., U.S. application Ser. No. 251,360, filed Sept. 30, 1988.

BRIEF DESCRIPTION OF THE INVENTION

This invention relates to an improved olefin polymerization process and catalyst system based on the use of a supported precursor of vanadium trihalide/electron donor complex and alkylaluminum or boron halides, which utilizes nonvolatile molecularly-bound promoters as a integral component of the catalyst modifier.

BACKGROUND TO THE INVENTION

Beran et al., U.S. Pat. No. 4,508,842, patented Apr. 2, 1985, describe an ethylene polymerization catalyst comprising a supported precursor of vanadium trihalide/electron donor complex and alkylaluminum or boron halides, when combined with alkylaluminum cocatalyst and alkyl halide promoter, (hereinafter in this specification and in the claims is called "Beran et al. catalyst system") provides enhanced polymerization and productivity plus a superior polyethylene product. Beran et al. describe a process and a catalyst system for producing polyethylene that involves polymerizing ethylene with or without at least one $C_3$ to $C_{10}$ alpha-olefin monomer in the gas phase at a temperature between about 30° C. to about 115° C. wherein the monomers are contacted with a catalyst composition comprising supported precursor vanadium compounds and modifiers which are impregnated on a solid, inert carrier. The catalysts utilized by Beran et al. differentiate in comprising a supported precursor, a cocatalyst and a promoter in which the supported precursor is a vanadium compound and modifier impregnated on a solid, inert carrier. The vanadium compound in the precursor is the reaction product of a vanadium trihalide and an electron donor. The halogen in the vanadium trihalide is chlorine, bromine or iodine, or mixtures thereof. A particularly preferred vanadium trihalide is vanadium trichloride, $VCl_3$. The electron donor is a liquid, organic Lewis base in which the vanadium trihalide is soluble. The electron donor is selected from the group consisting of alkyl esters of aliphatic and aromatic carboxylic acids, aliphatic ketones, aliphatic amines, aliphatic alcohols, alkyl and cycloalkyl ethers, and mixtures thereof. Preferred electron donors are alkyl and cycloalkyl ethers, including particularly tetrahydrofuran (THF). Between about 1 to about 20, preferably between about 1 to about 10, and most preferably about 3 moles of the electron donor are complexed with each mole of vanadium used.

The promoter, according to Beran et al., has the formula:

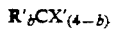

$$R'_b CX'_{(4-b)} \quad (I)$$

wherein R' is hydrogen or unsubstituted or halosubstituted lower alkyl, i.e., up to about $C_6$ containing alkyl; X' is halogen; and b is 0, 1 or 2. Preferred promoters include flouro, chloro or bromo substituted ethane or methane having at least 2 halogens attached to a carbon atom. Preferred promoters include $CCl_4$, $CHCl_3$, $CH_2Cl_2$, $CBr_4$, $CFCl_3$, $CH_3CCl_3$, and $CF_2ClCCl_3$. Particularly preferred promoters are methylene dichloride ($CH_2Cl_2$), 1,1,1, trichloroethane, ($CH_3CCl_3$), and chloroform ($CHCl_3$). Between about 0.1 to about 10, and preferably between about 0.2 to about 2, moles of promoter are used per mole of cocatalyst.

The Beran et al. catalyst system is produced by first preparing the supported precursor. The vanadium compound is impregnated onto the carrier. The modifier, dissolved in an inert solvent, such as a hydrocarbon, is then mixed with the vanadium impregnated carrier. The cocatalyst and promoter are added to the supported precursor either before and/or during the polymerization reaction. The cocatalyst and promoter are added either together or separately, and either simultaneously or sequentially during polymerization. The cocatalyst and promoter are preferably added separately as solutions in inert solvent, such as isopentane, during polymerization.

Thus the promoter is a separately fed component to the polymerization reaction. There are a number of disadvantages to the separate feeding of the promoter to the polymerization reaction. One obvious disadvantage is the additional step required of feeding the promoter to the polymerization reaction with its attendant problems of inaccurate feed, mixing problems, contact with the other catalyst components, and the like. A particularly vexing problem with the separate feed of the promoter to the reaction is associated with the volatility of the halohydrocarbon precursors.

THE INVENTION

This invention relates to a vanadium containing catalyst on a siliceous support containing a promoter which is chemically bound within the supported catalyst precursor. More particularly, the invention is directed to a vanadium catalyst wherein the catalyst is a Beran et al. catalyst system.

The invention is an improvement on the catalyst and process described by Beran et al.. The catalyst and process of this invention modifies Beran et al. catalyst system by fixing the promoter to a component of the catalyst composition such that it is a molecularly structural component of the catalyst and thus is not separately fed to the polymerization reaction, but instead is part of the catalyst composition fed to the reaction. As a result, the process of the invention obtains halide promotion without dependency of halide promoter in the vapor phase of the polymerization reaction.

This invention utilizes a promoter which is molecularly bound to at least one of the modifier or support or cocatalyst so that it is metered in with the catalyst and in physical location with the catalyst. The bound promoter of the invention involves the molecular condensation of a hydrolyzably and/or condensibly-functional halohydrocarbon to one or more of the modifiers as characterized by Beran et al., and as such is included in the catalyst formulation for the ethylene polymerization reaction.

This invention, in particular, is directed to a Beran et al. catalyst system containing a promoter which is chemically bound within the supported catalyst precursor, and in preference, the support of the supported catalyst precursor is a siliceous particulate material. In the typical practice of the invention, the promoter is chemically bound to a metal independent of the support or to the support.

Where the promoter is chemically bound to a metal independent of the support, the metal may be from Groups 1, 2, 12 and 13 (new notation) of the Periodic Table Of The Elements. The most preferred of the metals is aluminum.

Where the promoter is chemically and structurally bound to the support, it is desirable, and frequently preferable, that the promoter is directly bound to the support through chemical union with siloxy units of the support. This is typically achieved by the promoter being bound to the support though a direct bond to a metalate unit which is, in turn, bound to the support. The metal forming the metalate comprises a metal from Groups 1, 2, 12 and 13 (new notation) of the Periodic Table Of The Elements. The most preferred of the metals is aluminum.

The effecting the modification of the Beran et al. catalyst system according to the invention, the chemically bound promoter is derived from a haloalcohol. Typical of the haloalcohols are those of the formula:

(II)

wherein $R^{\diamond}$ is hydrogen, unsubstituted or halosubstituted lower alkyl, aromatic or cycloalkyl, b is 0 or 1, $X^o$ is one of chlorine, bromine, fluorine or iodine, and $R^o$ is a divalent organic group bonded to both the O and to the $CX^o$ moieties.

The derivation from the haloalcohol is commonly effected through a the haloalcohol metalate moiety of the structural formula:

(III)

wherein Me is a metal such as those from Groups 1, 2, 12 and 13 (new notation) of the Periodic Table Of The Elements or Me is bonded to a siloxy unit of the carrier, where the carrier is silica containing, as derived from the in situ reaction of one such other haloalcohol metalates with silanol groups on the surface of the silica carrier; x is equal to the remaining valences of Me and y is equal to the free valence of Me less the value of x; $R^{\diamond}$ is hydrogen, unsubstituted or halosubstituted lower alkyl, aromatic, or cycloalkyl, b is 0 or 1, $X^o$ is one of chlorine, bromine, fluorine or iodine, and $R^o$ is a divalent organic group bonded to both the O and to the $CX^o$ moieties. In the preferred system, Me is bound to a siloxy unit of the carrier, where the carrier is silica containing, as derived from the in situ reaction of one such other haloalcohol metalates with silanol groups on the surface of the silica carrier.

In an other aspect of the invention, the invention relates to novel catalyst compositions, novel promoter compositions and to processes for the polymerization of ethylene to make ethylene homopolymers and copolymers. The novel catalyst compositions of the invention comprise a supported precursor;
a cocatalyst; and
a bound halogen containing promoter.

In an other characterization of the invention, it involves a supported catalyst precursor for producing polyethylene wherein the supported catalyst precursor comprises the interreaction product of:

a) a vanadium compound which is the reaction product of a vanadium trihalide and a liquid, organic Lewis base electron donor in which the vanadium trihalide is soluble; and b) a modifier having the formula:

$$MX_a \qquad \text{(IV)}$$

wherein M is either boron or $AlR_{(3-a)}$ and wherein each R is independently alkyl provided that the total number of aliphatic carbon atoms in any one R group may not exceed 14; X is chlorine, bromine or iodine; and a is 1 or 2 with the provision that when M is boron, a is 3; said vanadium compound and said modifier are on a solid, inert carrier; the improvement which comprises c) utilizing as the promoter a promoter fixed to a component of the catalyst composition such that it is a molecularly structural component of the catalyst.

The invention also encompasses a process for the polymerization of an olefin, such as ethylene alone or copolymerized with an α-olefin, with the Beran et al. catalyst system which comprises providing the olefin and Beran et al. catalyst system containing a promoter which is chemically bound within the supported catalyst precursor to a reactor and polymerizing the olefin. The preferred Beran et al. catalyst system utilizes a support for the supported catalyst precursor which is a siliceous particulate material. Moreover, it is desired that the promoter be chemically bound to a metal independent of the support or to the support, as aforedefined. In the preferred practice of the process, it is carried out in the gas phase.

DETAIL DESCRIPTION OF THE INVENTION

The Supported Precursor

The Vanadium Compounds

The supported precursor is a vanadium compound and modifier impregnated on a solid, inert carrier (which is the support). The vanadium compound in the precursor is the reaction product of a vanadium trihalide and an electron donor. The halogen in the vanadium trihalide is chlorine, bromine or iodine, or mixtures thereof. A particularly preferred vanadium trihalide is vanadium trichloride, $VCl_3$.

The Electron Donor

The electron donor is a liquid, organic Lewis base in which the vanadium trihalide is soluble. The electron donor is selected from the group consisting of alkyl esters of aliphatic and aromatic carboxylic acids, aliphatic ketones, aliphatic amines, aliphatic alcohols, alkyl and cycloalkyl ethers, and mixtures thereof. Preferred electron donors are alkyl and cycloalkyl ethers, including particularly tetrahydrofuran. Between about 1 to about 20, preferably between about 1 to about 10, and most preferably about 3 moles of the electron donor are complexed with each mole of vanadium used.

The Modifier

The modifier used in the precursor has the formula:

$$MX_a \qquad \text{(IV)}$$

wherein M is either boron or $AlR_{(3-a)}$ and wherein each R is independently alkyl provided that the total number of aliphatic carbon atoms in any one R group may not exceed 14; X is chlorine, bromine or iodine; and a is 1 or 2 with the provision that when M is boron, a is 3. Preferred modifiers include $C_1$ to $C_6$ alkylaluminum mono- and dichlorides and boron trichloride. A particularly preferred modifier is diethyl aluminum chloride.

About 0.1 to about 10, and preferably about 0.2 to about 1.5 moles of modifier are used per mole of electron donor.

The Solid, Inert Carrier

The carrier is a solid, particulate porous material inert to the polymerization and desirably, is a siliceous containing particulate material. The carrier, or support, is typically a silica, alumina or aluminosilicate, i.e., oxides of silicon or aluminum or mixtures thereof, containing material. Optionally, the carrier may contain additional materials such as zirconia, thoria or other compounds chemically inert to the polymerization. The carrier is used as a dry powder having an average particle size of between about 10 to 250, preferably about 20 to about 200, and most preferably about 30 to about 100 microns. The porous carrier has a surface area of greater than or equal to about 3 and preferably greater than or equal to about 50 m$^2$/g. A preferred carrier is silica having pore sizes of greater than or equal to about 80, and preferably greater than or equal to about 100 angstroms. The carrier is predried by heating to remove water, preferably at a temperature of greater than or equal to about 600° C.

The amount of carrier used is that which will provide a vanadium content of between about 0.05 to about 1.0 mmoles of vanadium per gram of precursor (mmole V/g), and preferably between about 0.2 to about 0.55 mmole V/g, and most preferably about 0.5 mmole V/g.

The Cocatalyst

The cocatalyst has the formula:

$$AlR_3 \qquad (V)$$

wherein R is as previously defined in the definition of M in formula IV, supra. Preferred cocatalysts include $C_2$ to $C_8$ trialkylaluminum compounds. A particularly preferred cocatalyst is triisobutyl aluminum. Between about 5 to about 500, and preferably between about 10 to about 30 moles of cocatalyst are used per mole of vanadium.

The Bound Promoter

The promoter of the invention comprises the haloalcohol metalate moiety of the structural formula:

(III)

wherein Me is a metal such as those from Groups 1, 2, 12 and 13 (new notation) of the Periodic Table Of The Elements[1] and includes, for example, the alkali metals (lithium, sodium, potassium, rubidium and cesium), the alkaline earth metals (beryllium, magnesium, calcium, strontium and barium), zinc, cadmium, mercury, boron, aluminum, gallium, indium, tantalum, and the like; or Me is bonded to a siloxy unit of the carrier, where the carrier is silica containing, as derived from the in situ reaction of one such other haloalcohol metalates with silanol groups on the surface of the silica carrier; x is equal to the remaining valences of Me and y is equal to the free valence of Me less the value of x; $R^\lozenge$ is hydrogen, unsubstituted or halosubstituted lower alkyl, i.e., up to about $C_6$ containing alkyl, aromatic such as phenyl, benzyl, and the like, or cycloalkyl, b is 0 or 1, $X^o$ is one of chlorine, bromine, florine or iodine, and $R^o$ is a divalent organic group bonded to both the O and to the $CX^o$ moieties. $R^o$ may be aliphatic or aromatic. Illustrative of R are the following:

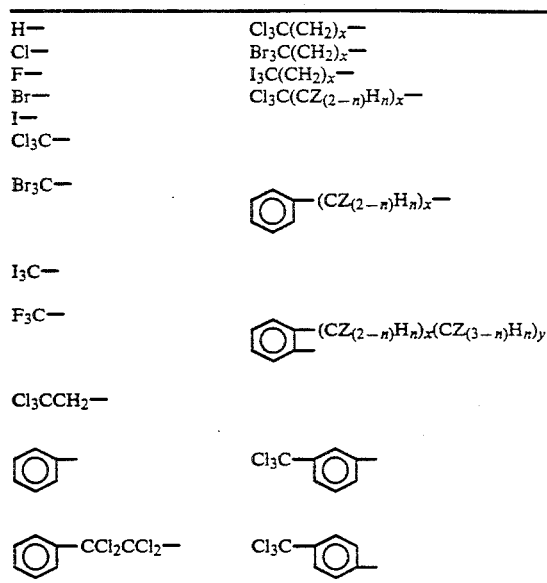

1. See CRC Handbook of Chemistry and Physics, 67th Edition, CRC Press Inc., Boca Raton, Florida, inside front cover.

Illustrative of $R^o$ are the following:

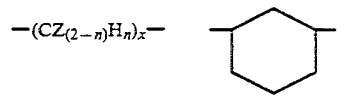

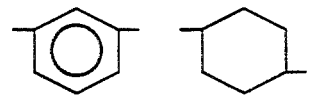

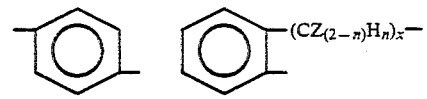

The promoter of the invention comprises the reaction product of a haloalcohol of the formula:

$$HO\text{-}R^oR^\lozenge_b CX^o_{(3-b)} \qquad (II)$$

wherein $R^\lozenge$, $R^o$, $X^o$, and b are described above; with a metalate forming moiety or compound containing the following structure:

(VIa)

wherein x and y have the meanings set forth above, Y is a hydrolyzable or condensible group such as halogen (e.g., chlorine, iodine, bromine or fluorine), hydroxyl, alkyl (e.g., lower alkoxy (viz., $C_{1-4}$)), alkoxy (e.g., lower alkoxy (viz., $C_{1-4}$)), aroxy, acyloxy (e.g., $C_{1-5}$), and the like; and in particular, a moiety of the following structure:

  (VIb)

wherein Y' is alkyl (e.g., lower alkoxy (viz., $C_{1-4}$)).

The metal compound prior to the reaction with the haloalcohol is capable of condensation with the haloalcohol so as to form a metal substituted haloalkoxy compound (the metalate) that is readily condensable with silanol groups (to form the silanate ester) on the support surface forming the catalyst precursor. In the preferred practice of the invention, Me is aluminum. When the metal is aluminum, it is not an important embodiment that the resulting metalate reaction product with the haloalcohol react with the silanol groups of the support surface. When the metal is one other than aluminum, the metal is specifically used to couple the haloalcohol to the surface of the carrier support, such as by reaction with surface silanol groups of the carrier to form a silanate unit. Illustrative of metalate and silanate forming reactions is the following:

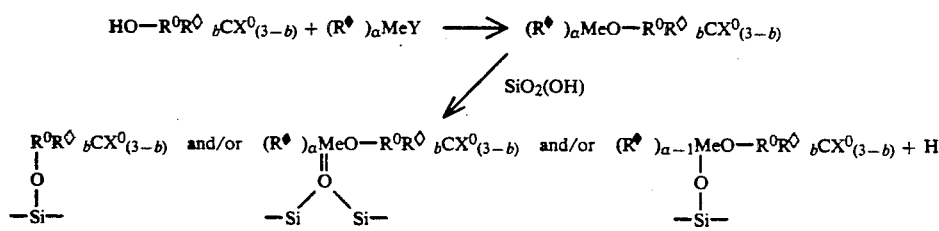

The aluminum containing compound is one or more of the aluminum compounds of the formula:

$$AlR_{(3-t)}Y'_t \qquad (VII)$$

wherein each R is independently alkyl provided that the total number of aliphatic carbon atoms in any one R group may not exceed 14; Y' is defined above; and t is 1 or 2. Preferred aluminum containing compounds include $C_1$ to $C_6$ trialkylaluminum and alkylaluminum mono- and dichlorides.

The reaction between the aluminum containing compound and the haloalcohol is illustrated by the following:

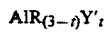

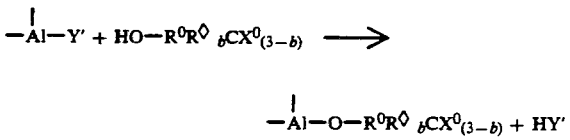

Illustrative of suitable haloalcohols are the following:

| | |
|---|---|
| HOCH$_2$CCl$_3$ | HOCH$_2$CH$_2$CFClCCl$_3$ |
| HOCH$_2$CHCl$_2$ | HOCH$_2$CH$_2$CHBrCCl$_3$ |
| HOCH$_2$CBr$_3$ | HOCH$_2$CH$_2$CBr$_2$CCl$_3$ |
| HOCH$_2$CHBr$_2$ | HOCH$_2$CH$_2$CBrClCCl$_3$ |
| HOCH$_2$CI$_3$ | HOCH$_2$CH$_2$ClClCCl$_3$ |
| HOCH$_2$CHI$_2$ | HOCH$_2$CH$_2$CHICHCl$_2$ |
| HOCH$_2$CH$_2$CCl$_3$ | HOCH$_2$CH$_2$CBr$_2$CBr$_3$ |
| HOCH$_2$CH$_2$CHCl$_2$ | HOCH$_2$CH$_2$CBr$_2$CHBr$_2$ |

-continued

| | |
|---|---|
| HOCH$_2$CH$_2$CBr$_3$ | HOCH$_2$CH$_2$Cl$_2$Cl$_3$ |
| HOCH$_2$CH$_2$CHBr$_2$ | HOCH$_2$CH$_2$CCl$_2$CHI$_2$ |
| HOCH$_2$CH$_2$Cl$_3$ | |
| HOCH$_2$CH$_2$CHI$_2$ | |

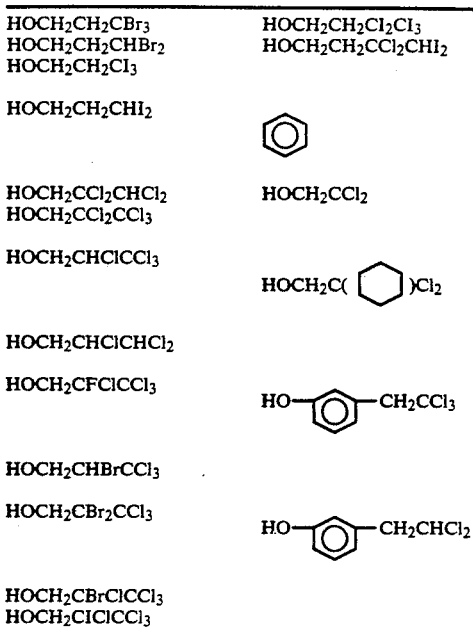

| HOCH$_2$CCl$_2$CHCl$_2$ | HOCH$_2$CCl$_2$ |
| HOCH$_2$CCl$_2$CCl$_3$ | |
| HOCH$_2$CHClCCl$_3$ | |

| HOCH$_2$CHClCHCl$_2$ | |
| HOCH$_2$CFClCCl$_3$ | |

| HOCH$_2$CHBrCCl$_3$ | |
| HOCH$_2$CBr$_2$CCl$_3$ | |

| HOCH$_2$CBrClCCl$_3$ | |
| HOCH$_2$ClClCCl$_3$ | |

HOCH$_2$CHICHCl$_2$

HOCH$_2$CBr$_2$CBr$_3$

HOCH$_2$CBr$_2$CHBr$_2$

HOCH$_2$Cl$_2$Cl$_3$
HOCH$_2$CCl$_2$CHI$_2$

HOCH$_2$CH$_2$CCl$_3$

HOCH$_2$CH$_2$CHCl$_2$
HOCH$_2$CH$_2$CBr$_3$

HOCH$_2$CH$_2$CHBr$_2$

HOCH$_2$CH$_2$CI$_3$
HOCH$_2$CH$_2$CHI$_2$

HOCH$_2$CH$_2$CH$_2$CCl$_3$

HOCH$_2$CH$_2$CH$_2$CHCl$_2$
HOCH$_2$CH$_2$CH$_2$CBr$_3$

HOCH$_2$CH$_2$CH$_2$CHBr$_2$

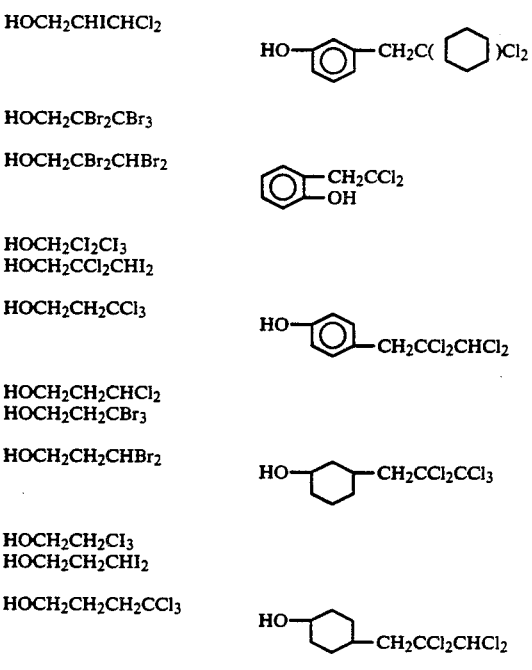

-continued

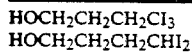
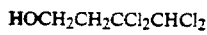

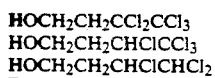
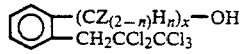

In the foregoing, Z may be one or more of halogen (e.g., chlorine, bromine, iodine or fluorine) and hydrogen.

The conditions of reaction of the haloalcohol with the metalate forming compound (viz., aluminum) or the reaction of the haloalcohol metalate with the silica silanol groups to form the promoter are not narrowly critical and, in most cases are dependent upon the reactants, their molar ratio, and the like considerations. The condensation of the haloalcohol metalate with a carrier's hydrolyzable or condensible group is normally effected under in situ polymerization conditions whereas the reaction of the metalate forming compound with the haloalcohol is effected at salt forming conditions. Typically, the temperature at which such a reaction can be effected may be as low as about 0° C. to as high as about 200° C. In the case of the reaction of a haloalcohol with a carrier, the temperature is typically between about 20° C. to about 80° C. In the case of the reaction between a haloalcohol and an aluminum modifier compound, the reaction is generally carried out in one or more solvents for the reactants, such as hydrocarbon solvents, at a temperature typically between about 0° C. to about 35° C. These reactions can be conveniently carried by slurrying the reactants in a common diluent or nonsolvent material. The evolution of condensation products in the course of the reaction is evidence that the reaction is effected.

The catalyst composition is produced by first preparing the supported precursor. The first step is dependent upon whether the carrier is reacted with the haloalcohol to provide the promoter to the polymerization reaction. If so, that reaction is effected first, and then the carrier with the bonded promoter is combined with the vanadium compound in the conventional manner. For example, in one embodiment, the vanadium compound is prepared by dissolving the vanadium trihalide in the electron donor at a temperature between about 20° C. up to the boiling point of the electron donor for a few hours. Preferably, mixing occurs at about 65° C. for about 3 hours. The vanadium compound so produced is then impregnated onto the carrier. Impregnation may be effected by adding the carrier as a dry powder or as a slurry in the electron donor or other inert solvent. The liquid is removed by drying at less than about 100° C. for a few hours, preferably between at about 45° to 70° C. for about 3 to 6 hours. The modifier, either reacted with the haloalcohol or not, is dissolved in an inert solvent, such as a hydrocarbon, and is then mixed with the vanadium impregnated carrier. The liquid is removed by drying at temperatures of less than about 70° C. for a few hours, preferably at about 45° C. for about 3 hours. The cocatalyst is added to the supported precursor either before and/or during the polymerization reaction. The cocatalyst is preferably added separately as a solution in inert solvent, such as isopentane, during polymerization.

The supports for these applications are dried to remove the free water and much of the bound water. Drying the support typically requires heating the support as a fluid bed using an inert atmosphere such as air, carbon dioxide or nitrogen, for about four (4) hours and longer, such as 6–10 hours, at 600°–800° C., followed by purging with nitrogen.

POLYMERIZATION

The ethylene polymerization is conducted in the gas phase using well established procedures in the art. It is preferred to polymerize in a continuous, fluidized bed. In a continuous process of this type, portions of the catalyst composition containing the promoter, along with the cocatalyst, and monomers are fed to a reactor vessel from which ethylene polymer product is continuously removed. With respect to ethylene copolymers, their density may be controlled and varied over a wide range, if desired, depending upon the amount of alpha-olefin comonomer addition and upon the particular comonomer employed. Lower densities are obtained with greater mole percent of alpha-olefin added to the polymerization as a polymerizate.

Polymerization is conducted at a temperature below the sintering of the ethylene polymer product. The operating temperature will range from between about 30° C. to about 115° C. Preferred operating temperatures will vary depending upon the polyethylene density which is desired. High density polyethylenes of greater than about 0.94 g/cc are produced at operating temperatures of between about 90° C. to about 110° C., and preferably at about 100° C. Low density polyethylenes ranging in density from about 0.91 to about 0.94 g/cc are preferably produced at an operating temperature of between about 75° C. to about 90° C. Very low density polyethylenes of less than about 0.91 g/cc are preferably produced at an operating temperature of between about 35° C. to about 75° C., using procedures as described in copending U.S. patent application Ser. No. 281,927, filed Dec. 6, 1988, by Karol et al., entitled "Preparation of Low Density, Low Modulus Ethylene Copolymers in a Fluidized Bed". Fluid bed reactors are typically operated at pressures of up to about 1000 psi and preferably between about 50 to about 350 psi.

The properties of the polymers produced in the examples were determined by the test procedures:

| Property | Test Procedure |
| --- | --- |
| Bulk Density (kg/m$^3$) | ASTM-D-1895 (Method B). |
| Density (g/cc) | ASTM-1505, based on ASTM-D-1928 (Procedure C) plaque preparation |
| Flow Index (dg/min) | ASTM D-1238-Condition F |
| Melt Flow Ratio | Flow Index/Melt Index; with melt index measured using ASTM D-1238 Condition E. |

Abbreviations used in the Examples are defined as follows:

| Designation | Description |
| --- | --- |
| DEAC | Diethylaluminum chloride |
| FI | Flow index |
| MI | Melt index |
| MFR | Melt flow ratio |
| TEAL | Triethylaluminum |
| THF | Tetrahydrofuran |

-continued

| Designation | Description |
|---|---|
| TIBA | Triisobutylaluminum |
| TCEtOH | 2,2,2-Trichloroethanol |
| TOS | Catalyst where silica is treated with 5.5 wt. % TEAL according to Beran et al. catalyst preparation; see col. 6, lines 61 et seq., esp. col. 7, lines 1-3 of Beran et al. |
| PAM | Promoter Addition Method |
| RM | reaction medium |
| S | Slurry polymerization |
| G | Gas phase polymerization |
| Cocat. | Cocatalyst |
| BD | Bulk density |
| Act. | Activity g polyethylene/mmol V-hr-100 psi. |
| NR | not recorded |
| EtAlOC | $C_2H_5Al(OCH_2CCl_3)_2$ room temperature reaction product of 1 mole of triethylaluminum and 2 moles of TCEtOH. |

| Catalyst type designation | V Loading mmol V/g | Al wt. % | DEAC/V mole ratio | THF wt. % | Support |
|---|---|---|---|---|---|
| A | 0.17 | 1.03 | 2.2 | 3.3 | Silica 600° C. |
| B | 0.20 | 2.70 | 2.0 | 4.6 | Silica 600° C. TOS (0.45 mmol Al/g Silica) |
| C | 0.27 | 3.51 | 3.0 | 6.9 | Silica 600° C. TOS (0.45 mmol Al/g Silica) |
| D | 0.26 | 3.25 | 4.5 | 7.0 | Silica 600° C. |

EXAMPLES

Catalyst Preparation Conditions

Base Catalyst Preparation

The following preparative method for making the base catalyst utilizes amounts of components that do not necessarily correspond to the amounts utilized hereinafter in the designated base catalyst compositions. The procedure may be adjusted in an obvious manner to reflect the ultimate designated base catalysts.

To a flask equipped with a mechanical stirrer were added 4 liters of anhydrous tetrahydrofuran (THF), followed by 50 grams (0.318 mole) of solid $VCl_3$. The mixture was heated under nitrogen at a temperature of 65° C. for 5 hours with continuous stirring in order to completely dissolve the $VCl_3$.

Eight hundred grams (800 g) of silica were dehydrated by heating under nitrogen at a temperature of 600° C. for 20 hours. The dehydrated silica or a TOS version was added to the solution prepared as above, and the mixture was refluxed for one hour under nitrogen. At the end of this time, the mixture was heated at a temperature of 55° C. for about 6 hours under a purge of dry nitrogen to produce a dry, free-flowing powder which in this case contains about 8 weight percent THF. The concentration of THF in the final base catalyst may be reduced to less than 8 weight percent THF by using less THF in the preparation. The TOS version of the silica is generated by treating the dehydrated silica with TEAL (optionally with a mixture of TEAL and DEAC) to provide silica containing 0.45 mmol Al/g silica.

Five hundred grams (500 g) of the silica carrier impregnated with $VCl_3$/THF reaction product were slurried in 4 liters of anhydrous hexane. The slurry was continuously stirred while a 10 weight percent solution of diethylaluminum chloride in anhydrous hexane was added over a period of 30 minutes. The impregnated carrier and the diethylaluminum chloride solution were employed in amounts that provided a desired atomic ratio of aluminum to vanadium. After addition of the diethylaluminum chloride solution was complete, the mixture was heated at a temperature of 45° C. for about 6 hours under a purge of dry nitrogen to produce a dry, free-flowing powder.

Slurry polymerization reaction conditions

To a one liter stirred reactor is added 500 cu. centimeters of dry degassed hexane and twenty cu. centimeters of 1-hexene. Into a 125 cu. centimeter sample bottle is charged 100 cu. centimeters of hexane under nitrogen followed by the vanadium based catalyst with the bound promoter and the cocatalyst. The contents of the sample bottle are transferred to the reactor under nitrogen pressure and the reactor is heated to 70° C. The reactor is charged with hydrogen to one pound per square inch gauge (psig) followed by ethylene at a total reactor pressure of 160 psig. The reaction is run to 85° C. for 30 minutes.

Gas phase polymerization conditions

To a one liter stirred reactor is added a bed consisting of 125 grams of 0.918 density, 1.0 melt index granular polyethylene. The reactor is heated to 80° C. and purged with nitrogen for 30 minutes to remove moisture and oxygen. The reactor is then cooled to 70° C. The cocatalyst is charged to the reactor and allowed to stir for five minutes. Catalyst is then charged as a dry solid, followed by promoter and any comonomer (when employed). Hydrogen is batched charged, followed by ethylene feed using a demand feed system. The reactor temperature is raised to 85° C. for a 30 minute reaction period. The yield is determined by substracting the initial bed weight from the total solids content after reaction is complete.

Siloxy Haloalcohol Reaction

A solution formed of 10 ml (1 molar) $SiCl_4$ in hexane, 40 ml (1 molar) 2,2,2-trichloroethanol in hexane, and 30 ml hexane, was refluxed for 2 days under $N_2$. No $SiCl_4$ remained in the solution. The solution was concentrated to dryness under high vacuum and the residue solidified overnight. The net weight was 3.48 g which represents a 56% yield. The residue is characterized as an orthosilicate of the formula:

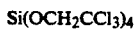

$Si(OCH_2CCl_3)_4$ though it is believed that a portion of the reaction product is low molecular weight siloxane such as disiloxane, trisiloxane, and the like siloxane oligomers of higher molecular weight, probably yielding a structure of the general formula:

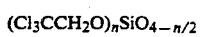

$(Cl_3CCH_2O)_nSiO_{4-n/2}$ wherein n has a value of 1-4. When used in the examples hereafter, it is designated "SiOC/Cl" for convenience.

R group may not exceed 14; X is chlorine, bromine, or iodine; and a is 1 or 2 with the provision that when M is boron, a is 3;

| EX. No. | Cat. Type | PAM | Cocat. | Cocat. eq/V | RM | Act. | MI | FI | MFR | Bulk Dens. | Hexene (ml). |
|---|---|---|---|---|---|---|---|---|---|---|---|
| 1 | C | none added | TIBA | 20 | S | 700 | NR | NR | NR | 0.41 | 20 |
| 2 | C | 30 eq. TCEtOH added separately[a] | TIBA | 60 | S | 2961 | 28.50 | 1082.0 | 38.0 | 0.24 | 20 |
| 3 | C | 6 eq TCEtOH Coimpregnated[b] | TIBA | 25 | S | 1867 | NR | NR | NR | 0.30 | 20 |
| 4 | C | 5 eq (Cl$_3$CCH$_2$O)$_2$AlEt Coimpregnated[c] | TIBA | 12 | S | 2081 | NR | NR | NR | 0.26 | 20 |
| 5 | C | 5 eq (Cl$_3$CCH$_2$O)$_2$AlEt Coimpregnated[c] | TIBA | 25 | S | 1855 | 10.30 | 807.6 | 78.3 | 0.27 | 20 |
| 6 | A | 6 eq. TCEtOH impregnated[b] | TIBA | 40 | S | 1494 | 0.26 | 18.0 | 69.0 | 0.28 | none |
| 7 | A | 6 eq. TCEtOH impregnated[b] | TIBA | 40 | S | 1654 | 0.27 | 17.5 | 65.0 | 0.28 | none |
| 8 | B | 9 eq. TCEtOH impregnated[b] | TIBA | 40 | S | 1037 | 0.36 | 25.6 | 71.0 | 0.24 | none |
| 9 | D | none added | TEAL | 40 | S | 278 | 0.15 | NR | NR | 0.30 | 30 |
| 10 | D | 10 eq. SiOC/Cl separately added | TEAL | 40 | S | 2863 | 21.00 | 908.0 | 43.0 | 0.30 | 20 |
| 11 | D | 10 eq. SiOC/Cl separately added | TIBA | 40 | S | 2745 | 18.00 | 647.0 | 36.0 | 0.23 | 20 |
| 12 | D | 2 eq. SiOC/Cl impregnated | TIBA | 40 | S | 3003 | 45.50 | 1689.0 | 37.0 | 0.25 | 20 |
| 13 | C | none added | TIBA | 25 | G | 191 | NR | NR | NR | NR | 6 |
| 14 | C | 6 eq TCEtOH impregnated[b] | TIBA | 40 | G | 710 | NR | NR | NR | NR | 6 |
| 15 | C | 5 eq Cl$_3$C—CH$_2$ \ Al(iBu)$_2$—O Coimpregnated[d] | TIBA | 40 | G | 684 | NR | NR | NR | NR | 6 |
| 16 | C | 5 eq (Cl$_3$CCH$_2$O)$_2$AlEt Coimpregnated[c] | TIBA | 40 | G | 769 | NR | NR | NR | NR | 6 |

Reaction Conditions:
"S" conditions: hexane slurry; 40 EQ COCAT./V; 1 psi H$_2$/160 total psi; 30 mins. run; 85° C.

"G" Conditions: 85° C. temperature; 30 min reaction period; 1 ⟶ 10 psi H$_2$; 130-160 total pressure; 0-20 ml hexane; 135 g polymer bed used Footnotes To Table:
[a] TCEtOH added after reduction ROH + TIBA $\xrightarrow{fast}$ DibuAl—OR
[b] TCEtOH fixed to catalyst in hexane by reaction with aluminum containing compounds.
[c] (TCEtO)$_2$AlEt fixed 10 eq total RX$_3$/V
[d] TCEtOAl(ibu)$_2$ fixed to catalyst as promoter.

We claim:

1. In a catalyst system for producing polyethylene comprising:
(a) a supported catalyst precursor comprising a siliceous carrier impregnated with:
  (i) a vanadium compound which is the reaction product of a vanadium trihalide and a liquid, organic Lewis base electron donor in which the vanadium trihalide is soluble; and
  (ii) a modifier having the formula:

MX$_a$ wherein M is either boron or AlR$_{(3-a)}$ and wherein each R is independently alkyl provided that the total number of aliphatic carbon atoms in any one R group may not exceed 14; X is chlorine, bromine, or iodine; and a is 1 or 2 with the provision that when M is boron, a is 3;
(b) an alkylaluminum cocatalyst; and
(c) an alkyl halide polymerization promoter;
the improvement which comprises utilizing a polymerization promoter which is chemically bound within the supported catalyst precursor as a result of molecular condensation of a hydrolyzably and/or condensibly-functional halohydrocarbon.

2. The catalyst system of claim 1 wherein the promoter is chemically bound to a metal independent of the support or the support.

3. The catalyst system of claim 2 wherein the promoter is chemically bound to a metal independent of the support.

4. The catalyst system of claim 3 wherein the metal is from Groups 1, 2, 12 and 13 (new notation) of the Periodic Table Of The Elements.

5. The catalyst system of claim 4 wherein the metal is aluminum.

6. The catalyst system of claim 2 wherein the promoter is chemically and structurally bound to the support.

7. The catalyst system of claim 6 wherein the promoter is directly bound to the support through chemical union with siloxy units of the support.

8. The catalyst system of claim 6 wherein the promoter is bound to the support through a direct bond to a metalate unit which is, in turn, bound to the support.

9. The catalyst system of claim 8 wherein the metal forming the metalate comprises a metal from Groups 1, 2, 12 and 13 (new notation) of the Periodic Table Of The Elements.

10. The catalyst system of claim 9 wherein the metal is aluminum.

11. The catalyst system of claim 1 wherein the promoter is chemically bound to the supported catalyst precursor as a result of molecular condensation of a haloalcohol.

12. The catalyst system of claim 2 wherein the promoter is chemically bound to the supported catalyst precursor as a result of molecular condensation of a haloalcohol.

13. The catalyst system of claim 4 wherein the promoter is chemically bound to the supported catalyst precursor as a result of molecular condensation of a haloalcohol.

14. The catalyst system of claim 4 wherein the promoter is chemically bound to the supported catalyst precursor as a result of molecular condensation of a haloalcohol.

15. The catalyst system of claim 5 wherein the promoter is chemically bound to the supported catalyst precursor as a result of molecular condensation of a haloalcohol.

16. The catalyst system of claim 6 wherein the promoter is chemically bound to the supported catalyst precursor as a result of molecular condensation of a haloalcohol.

17. The catalyst system of claim 7 wherein the promoter is chemically bound to the supported catalyst precursor as a result of molecular condensation of a haloalcohol.

18. The catalyst system of claim 8 wherein the promoter is chemically bound to the supported catalyst precursor as a result of molecular condensation of a haloalcohol.

19. The catalyst system of claim 9 wherein the promoter is chemically bound to the supported catalyst precursor as a result of molecular condensation of a haloalcohol.

20. The catalyst system of claim 10 wherein the promoter is chemically bound to the supported catalyst precursor as a result of molecular condensation of a haloalcohol.

21. The catalyst system of claim 11 wherein the haloalcohol has the formula:

$$HO\text{-}R^oR^\diamond{}_b CX^o{}_{(3-b)} \qquad (II)$$

wherein $R^\diamond$ is hydrogen, unsubstituted or halo-substituted lower alkyl, aromatic or cycloalkyl, b is 0 or 1, $X^o$ is one of chlorine, bromine, fluorine or iodine, and $R^o$ is a divalent organic group bonded to both the O and to the $CX^o$ moieties.

22. The catalyst system of claim 12 wherein the haloalcohol has the formula:

$$HO\text{-}R^oR^\diamond{}_b CX^o{}_{(3-b)} \qquad (II)$$

wherein $R^\diamond$ is hydrogen, unsubstituted or halo-substituted lower alkyl, aromatic or cycloalkyl, b is 0 or 1, $X^o$ is one of chlorine, bromine, fluorine or iodine, and $R^o$ is a divalent organic group bonded to both the O and to the $CX^o$ moieties.

23. The catalyst system of claim 13 wherein the haloalcohol has the formula:

$$HO\text{-}R^oR^\diamond{}_b CX^o{}_{(3-b)} \qquad (II)$$

wherein $R^\diamond$ is hydrogen, unsubstituted or halo-substituted lower alkyl, aromatic or cycloalkyl, b is 0 or 1, $X^o$ is one of chlorine, bromine, fluorine or iodine, and $R^o$ is a divalent organic group bonded to both the O and to the $CX^o$ moieties.

24. The catalyst system of claim 14 wherein the haloalcohol has the formula:

$$HO\text{-}R^oR^\diamond{}_b CX^o{}_{(3-b)} \qquad (II)$$

wherein $R^\diamond$ is hydrogen, unsubstituted or halo-substituted lower alkyl, aromatic or cycloalkyl, b is 0 or 1, $X^o$ is one of chlorine, bromine, fluorine or iodine, and $R^o$ is a divalent organic group bonded to both the O and to the $CX^o$ moieties.

25. The catalyst system of claim 15 wherein the haloalcohol has the formula:

$$HO\text{-}R^oR^\diamond{}_b CX^o{}_{(3-b)} \qquad (II)$$

wherein $R^\diamond$ is hydrogen, unsubstituted or halo-substituted lower alkyl, aromatic or cycloalkyl, b is 0 or 1, $X^o$ is one of chlorine, bromine, fluorine or iodine, and $R^o$ is a divalent organic group bonded to both the O and to the $CX^o$ moieties.

26. The catalyst system of claim 16 wherein the haloalcohol has the formula:

$$HO\text{-}R^oR^\diamond{}_b CX^o{}_{(3-b)} \qquad (II)$$

wherein $R^\diamond$ is hydrogen, unsubstituted or halo-substituted lower alkyl, aromatic or cycloalkyl, b is 0 or 1, $X^o$ is one of chlorine, bromine, fluorine or iodine, and $R^o$ is a divalent organic group bonded to both the O and to the $CX^o$ moieties.

27. The catalyst system of claim 17 wherein the haloalcohol has the formula:

$$HO\text{-}R^oR^\diamond{}_b CX^o{}_{(3-b)} \qquad (II)$$

wherein $R^\diamond$ is hydrogen, unsubstituted or halo-substituted lower alkyl, aromatic or cycloalkyl, b is 0 or 1, $X^o$ is one of chlorine, bromine, fluorine or iodine, and $R^o$ is a divalent organic group bonded to both the O and to the $CX^o$ moieties.

28. The catalyst system of claim 18 wherein the haloalcohol has the formula:

$$HO\text{-}R^oR^\diamond{}_b CX^o{}_{(3-b)} \qquad (II)$$

wherein $R^\diamond$ is hydrogen, unsubstituted or halo-substituted lower alkyl, aromatic or cycloalkyl, b is 0 or 1, $X^o$ is one of chlorine, bromine, fluorine or iodine, and $R^o$ is a divalent organic group bonded to both the O and to the $CX^o$ moieties.

29. The catalyst system of claim 19 wherein the haloalcohol has the formula:

  (II)

wherein $R^\diamond$ is hydrogen, unsubstituted or halo-substituted lower alkyl, aromatic or cycloalkyl, b is 0 or 1, $X^o$ is one of chlorine, bromine, fluorine or iodine, and $R^o$ is a divalent organic group bonded to both the O and to the $CX^o$ moieties.

30. The catalyst system of claim 20 wherein the haloalcohol has the formula:

  (II)

wherein $R^\diamond$ is hydrogen, unsubstituted or halo-substituted lower alkyl, aromatic or cycloalkyl, b is 0 or 1, $X^o$ is one of chlorine, bromine, fluorine or iodine, and $R^o$ is a divalent organic group bonded to both the O and to the $CX^o$ moieties.

31. The catalyst system of claim 11 wherein the chemically bound promoter is a haloalcohol metalate moiety of the structural formula:

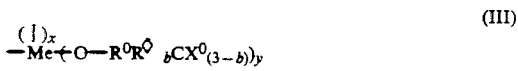  (III)

wherein Me is a metal such as those from Groups 1, 2, 12 and 13 (new notation) of the Periodic Table Of The Elements or Me is bonded to a siloxy unit of the carrier, where the carrier is silica containing, as derived from the in situ reaction of one such other haloalcohol metalates with silanol groups on the surface of the silica carrier; x is equal to the remaining valences of Me and y is equal to the free valence of Me less the value of x; $R^\diamond$ is hydrogen, unsubstituted or halosubstituted lower alkyl, aromatic, or cycloalkyl, b is 0 or 1, $X^o$ is one of chlorine, bromine, fluorine or iodine, and $R^o$ is a divalent organic group bounded to both the O and to the $CX^o$ moieties.

32. The catalyst system of claim 12 wherein the chemically bound promoter is a haloalcohol metalate moiety of the structural formula:

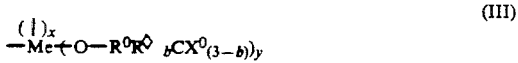  (III)

wherein Me is a metal such as those from Groups 1, 2, 12 and 13 (new notation) of the Periodic Table Of The Elements or Me is bonded to a siloxy unit of the carrier, where the carrier is silica containing, as derived from the in situ reaction of one such other haloalcohol metalates with silanol groups on the surface of the silica carrier; x is equal to the remaining valences of Me and y is equal to the free valence of Me less the value of x; $R^\diamond$ is hydrogen, unsubstituted or halosubstituted lower alkyl, aromatic, or cycloalkyl, b is 0 or 1, $X^o$ is one of chlorine, bromine, fluorine or iodine, and $R^o$ is a divalent organic group bounded to both the O and to the $CX^o$ moieties.

33. The catalyst system of claim 13 wherein the chemically bound promoter is a haloalcohol metalate moiety of the structural formula:

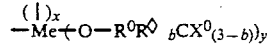  (III)

wherein Me is a metal such as those from Groups 1, 2, 12 and 13 (new notation) of the Periodic Table Of The Elements or Me is bonded to a siloxy unit of the carrier, where the carrier is silica containing, as derived from the in situ reaction of one such other haloalcohol metalates with silanol groups on the surface of the silica carrier; x is equal to the remaining valences of Me and y is equal to the free valence of Me less the value of x; $R^\diamond$ is hydrogen, unsubstituted or halosubstituted lower alkyl, aromatic, or cycloalkyl, b is 0 or 1, $X^o$ is one of chlorine, bromine, fluorine or iodine, and $R^o$ is a divalent organic group bounded to both the O and to the $CX^o$ moieties.

34. The catalyst system of claim 14 wherein the chemically bound promoter is a haloalcohol metalate moiety of the structural formula:

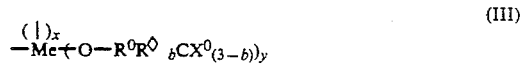  (III)

wherein Me is a metal such as those from Groups 1, 2, 12 and 13 (new notation) of the Periodic Table Of The Elements or Me is bonded to a siloxy unit of the carrier, where the carrier is silica containing, as derived from the in situ reaction of one such other haloalcohol metalates with silanol groups on the surface of the silica carrier; x is equal to the remaining valences of Me and y is equal to the free valence of Me less the value of x; $R^\diamond$ is hydrogen, unsubstituted or halosubstituted lower alkyl, aromatic, or cycloalkyl, b is 0 or 1, $X^o$ is one of chlorine, bromine, fluorine or iodine, and $R^o$ is a divalent organic group bounded to both the O and to the $CX^o$ moieties.

35. The catalyst system of claim 15 wherein the chemically bound promoter is a haloalcohol metalate moiety of the structural formula:

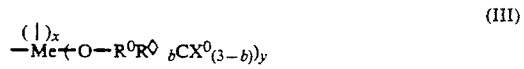  (III)

wherein Me is a metal such as those from Groups 1, 2, 12 and 13 (new notation) of the Periodic Table Of The Elements or Me is bonded to a siloxy unit of the carrier, where the carrier is silica containing, as derived from the in situ reaction of one such other haloalcohol metalates with silanol groups on the surface of the silica carrier; x is equal to the remaining valences of Me and y is equal to the free valence of Me less the value of x; $R^\diamond$ is hydrogen, unsubstituted or halosubstituted lower alkyl, aromatic, or cycloalkyl, b is 0 or 1, $X^o$ is one of chlorine, bromine, fluorine or iodine, and $R^o$ is a divalent organic group bounded to both the O and to the $CX^o$ moieties.

36. The catalyst system of claim 16 wherein the chemically bound promoter is a haloalcohol metalate moiety of the structural formula:

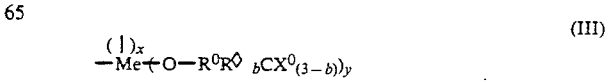  (III)

wherein Me is a metal such as those from Groups 1, 2, 12 and 13 (new notation) of the Periodic Table Of The Elements or Me is bonded to a siloxy unit of the carrier, where the carrier is silica containing, as derived from the in situ reaction of one such other haloalcohol metalates with silanol groups on the surface of the silica carrier; x is equal to the remaining valences of Me and y is equal to the free valence of Me less the value of x; $R^\lozenge$ is hydrogen, unsubstituted or halosubstituted lower alkyl, aromatic, or cycloalkyl, b is 0 or 1, $X^o$ is one of chlorine, bromine, fluorine or iodine, and $R^o$ is a divalent organic group bounded to both the O and to the $CX^o$ moieties.

37. The catalyst system of claim 17 wherein the chemically bound promoter is a haloalcohol metalate moiety of the structural formula:

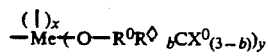
(III)

wherein Me is a metal such as those from Groups 1, 2, 12 and 13 (new notation) of the Periodic Table Of The Elements or Me is bonded to a siloxy unit of the carrier, where the carrier is silica containing, as derived from the in situ reaction of one such other haloalcohol metalates with silanol groups on the surface of the silica carrier; x is equal to the remaining valences of Me and y is equal to the free valence of Me less the value of x; $R^\lozenge$ is hydrogen, unsubstituted or halosubstituted lower alkyl, aromatic, or cycloalkyl, b is 0 or 1, $X^o$ is one of chlorine, bromine, fluorine or iodine, and $R^o$ is a divalent organic group bounded to both the O and to the $CX^o$ moieties.

38. The catalyst system of claim 18 wherein the chemically bound promoter is a haloalcohol metalate moiety of the structural formula:

(III)

wherein Me is a metal such as those from Groups 1, 2, 12 and 13 (new notation) of the Periodic Table Of The Elements or Me is bonded to a siloxy unit of the carrier, where the carrier is silica containing, as derived from the in situ reaction of one such other haloalcohol metalates with silanol groups on the surface of the silica carrier; x is equal to the remaining valences of Me and y is equal to the free valence of Me less the value of x; $R^\lozenge$ is hydrogen, unsubstituted or halosubstituted lower alkyl, aromatic, or cycloalkyl, b is 0 or 1, $X^o$ is one of chlorine, bromine, fluorine or iodine, and $R^o$ is a divalent organic group bounded to both the O and to the $CX^o$ moieties.

39. The catalyst system of claim 19 wherein the chemically bound promoter is a haloalcohol metalate moiety of the structural formula:

(III)

wherein Me is a metal such as those from Groups 1, 2, 12 and 13 (new notation) of the Periodic Table Of The Elements or Me is bonded to a siloxy unit of the carrier, where the carrier is silica containing, as derived from the in situ reaction of one such other haloalcohol metalates with silanol groups on the surface of the silica carrier; x is equal to the remaining valences of Me and y is equal to the free valence of Me less the value of x; $R^\lozenge$ is hydrogen, unsubstituted or halosubstituted lower alkyl, aromatic, or cycloalkyl, b is 0 or 1, $X^o$ is one of chlorine, bromine, fluorine or iodine, and $R^o$ is a divalent organic group bounded to both the O and to the $CX^o$ moieties.

40. The catalyst system of claim 20 wherein the chemically bound promoter is a haloalcohol metalate moiety of the structural formula:

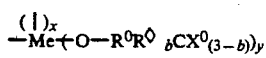
(III)

wherein Me is a metal such as those from Groups 1, 2, 12 and 13 (new notation) of the Periodic Table Of The Elements or Me is bonded to a siloxy unit of the carrier, where the carrier is silica containing, as derived from the in situ reaction of one such other haloalcohol metalates with silanol groups on the surface of the silica carrier; x is equal to the remaining valences of Me and y is equal to the free valence of Me less the value of x; $R^\lozenge$ is hydrogen, unsubstituted or halosubstituted lower alkyl, aromatic, or cycloalkyl, b is 0 or 1, $X^o$ is one of chlorine, bromine, fluorine or iodine, and $R^o$ is a divalent organic group bounded to both the O and to the $CX^o$ moieties.

41. The catalyst system of claim 31 wherein Me is a silicon of siloxy unit of the carrier, where the carrier is silica containing, as derived from the in situ reaction of one such other haloalcohol metalates with silanol groups on the surface of the silica carrier.

42. In a supported catalyst precursor for producing polyethylene wherein the supported catalyst precursor comprises the interreaction product of:

a) a vanadium compound which is the reaction product of a vanadium trihalide and a liquid, organic Lewis base electron donor in which the vanadium trihalide is soluble; and b) a modifier having the formula:

$$MX_a$$

wherein M is either boron or $AlR_{(3-a)}$ and wherein each R is independently alkyl provided that the total number of aliphatic carbon atoms in any one R group may not exceed 14; X is chlorine, bromine or iodine; and a is 1 or 2 with the provision that when M is boron, a is 3; said vanadium compound and said modifier are on a solid, inert carrier; the improvement which comprises c) utilizing as the polymerization promoter a promoter fixed to a component of the catalyst composition such that it is a molecularly structural component of the catalyst as a result of molecular condensation of a hydrolyzably and/or condensibly-functional halohydrocarbon.

* * * * *